May 8, 1945.  E. L. HOLLOWELL ET AL  2,375,415
BRAKE CONSTRUCTION
Filed Nov. 28, 1941

E. L. HOLLOWELL AND M. T. BURK
INVENTORS.

BY  Dick and Bailey

Patented May 8, 1945

2,375,415

UNITED STATES PATENT OFFICE 2,375,415

BRAKE CONSTRUCTION

Everett L. Hollowell and Munson T. Burk, Des Moines, Iowa

Application November 28, 1941, Serial No. 420,834

8 Claims. (Cl. 188—152)

This invention relates to the braking systems of vehicles, and is more specifically concerned with hydraulic brakes which at the present time find their principal application in automobiles, semi-trailers, busses, and the like.

It is almost universally admitted that brakes of the hydraulic type are superior to other brake constructions when they are functioning properly. Hydraulic brakes are, however, open to one very serious objection, namely, the fact that when the hydraulic system becomes defective in any part, as for example, when a leak occurs in any of the lines, cylinders, or connections, no braking effect whatever is procured upon depression of the brake pedal for the fluid, upon pressure being applied thereto, takes exit from the system through the abnormal opening therein rather than operating the pistons at the wheels, as such is the course of least resistance.

It is a object of this invention to provide hydraulic brake construction which avoids the objection to hydraulic brakes heretofore available.

Another object of this invention is to provide a hydraulic brake construction which will furnish very substantial braking power, unless at least two leaks occur in the system simultaneously.

Another object of this invention is to provide novel means for securing ultimate movement in one direction by a plurality of members driven by a single member traveling in the same direction.

Another object of this invention is to provide a novel process for braking a vehicle hydraulically.

Yet another object of this invention is to provide a brake in which braking potential is substantially insured at all times in at least either the front or rear brakes of the vehicle.

A still further object of this invention is to provide a hydraulic brake construction in which the front brakes and rear brakes of the vehicle, while operated by a single control lever or pedal, are independent of each other in their hydraulic connections.

In general, our invention consists in the provision of a braking system having two master cylinders, one of which operates the front wheel brakes of the vehicle, and the other of which operates the rear wheel brakes. The pistons of the respective master cylinders are operated by a single control in the cab of the vehicle.

In order that a clearer and concise understanding of our invention may be had, reference should be made to the accompanying drawing forming a part of this specification, Figure 1 is a fragmentary perspective view of an automobile braking system embodying one form of our invention.

Figure 1:
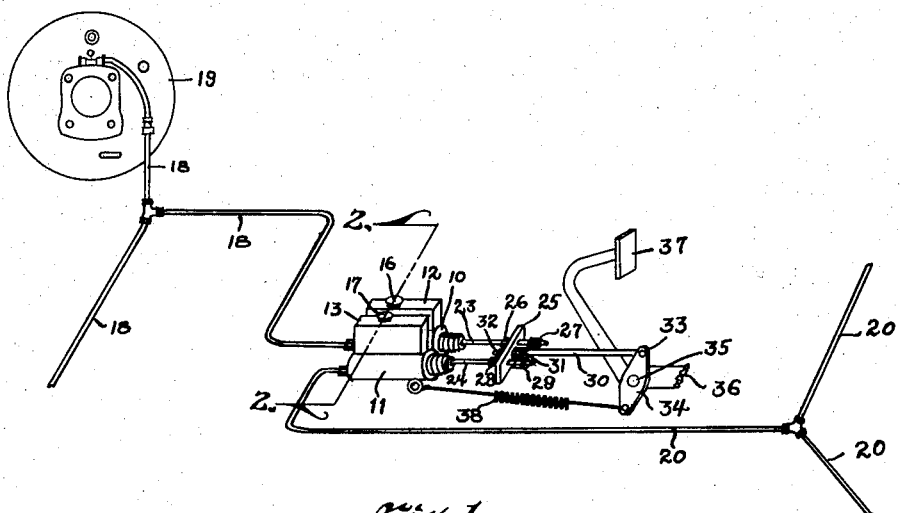

Referring now more specifically to the drawing, we have employed the reference characters 10 and 11 to designate master cylinders in the construction which we have shown for illustrative purposes. These master cylinders are provided respectively with reservoirs 12 and 13 having fill openings 14 and 15 normally closed by stoppers 16 and 17. The master cylinder 10 is connected by means of inter-communicating conduit structure 18 with the two front wheel brakes of the vehicle, one of which is shown at 19. Similarly the master cylinder 11 is connected by means of the conduits 20 to the two rear wheel brakes. The pistons 21 and 22 located in the master cylinders 10 and 11, respectively, are operated by piston rods 23 and 24, respectively. The outer ends of the said piston rods 23 and 24 are received in suitable openings provided in bar 25 and nuts 26, 27, 28, and 29, are provided on said piston rods on each side of said bar 25 for controlling movements of said bar 25 and said rods 23 and 24 as will hereafter more clearly appear. The rod 30 received at one end in an opening provided in the bar 25 and provided with nuts 31 and 32 for controlling its movement relative to said bar, is pivotally connected at its other end at 33 to cross bar 34 which is pivotally mounted at 35 to the vehicle frame 36. A foot pedal controlled device 37 is rigidly connected to the cross bar 34 for rotating said cross bar about its pivot to produce longitudinal movement of the rod 30. As the rod 30 moves toward the master cylinders 10 and 11, its nut 31 engages the bar 25, it in turn engages the nuts 26 and 28 driving the piston rods 23 and 24 forward, causing the pistons 21 and 22 to force fluid through the conduits 18 and 20, respectively, thus applying both the front and rear wheel brakes. The tension spring 38 serves to return the pistons, connecting rods, and brake pedal to inoperative positions upon the operator's foot being removed from the pedal 37. It will be noted upon scrutinizing Figure 3 that the openings in the bar 25 which receive the rods 23, 24, and 30 are of diameters somewhat greater than the rods which they respectively receive. This construction is optional, but is preferable in that it provides means for automatic adjustment in the coupling structure for slightly varied conditions in the two fluid circuits. For example, in the event that the piston 21 begins its braking action at a slightly earlier point in its stroke than does the piston 22, that end of the bar 25 which engages the nut 26 halts its forward motion momentarily upon meeting substantial resistance from the piston 21, permitting the end of the bar 25, which engages the nut 28, to continue to travel forward until the piston 22 begins its braking action. When substantial resistance is encountered by both ends of the bar 25, both ends travel forward applying both the front and rear wheel brakes. If a leak is present in one of the two hydraulic circuits, that end of the bar 25 which normally operates the faulty circuit continues to move forward until the walls of the openings in the bar 25 in which the rods 23, 30 and 24 are received prevent said rods from further shifting their positions in said openings. Thereafter further forward movement of the rod 30 causes forward movement of the entire bar 25, forcing forward the piston of that fluid circuit which is intact and applying either the front or rear wheel brakes as the case may be. The nuts 27, 32, and 29 may be variously spaced from the plate 25 in order to reduce and control the extent to which the plate 25 is allowed to shift from its true transverse position. The extent to which the plate 25 is permitted to vary from a right angle relationship to the piston rods 23 and 24 must, of course, be definitely restricted in order to insure the application of that set of brakes which is connected to the properly functioning fluid circuit when one fluid circuit is defective. Otherwise the bar 25 could swing into a position substantially parallel to that of the rod 30 before being forced to apply substantial pressure to the piston rod of the non-defective circuit. Of course if the bar 25 is short it may be permissible to permit it to take such a position in the event of a leak. However, in our preferred construction the said bar 25 is of such length that the control device would be substantially at the end of its stroke by the time that the bar 25 would have reached a position substantially parallel to the rod 30, if permitted to do so.

Figure 3:
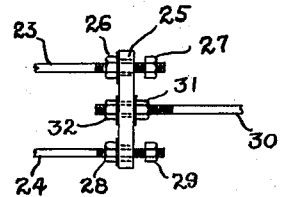
Figure 3 is a top plan view of the coupling construction shown in Figure 1 illustrating the device in detail.
Figure 2:
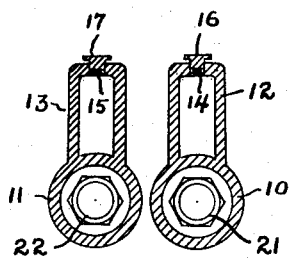
Figure 2 is a cross sectional view taken on line 2—2 of Figure 1.
Figure 4:
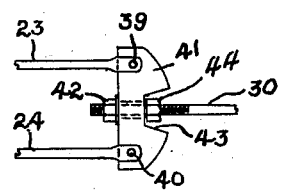
Figure 4 is a top plan view of a modified form of coupling.

In Fig. 4 we have shown another form of coupling which may be substituted for the structure shown in Fig. 3. The piston rods 23 and 24 are pivotally mounted at 39 and 40 respectively on the bar 41. An opening through the central portion of said bar 41 is provided for receiving the rod 30, similarly as in Fig. 3, said opening being of greater diameter than the rod which it receives in order to permit limited shifting of the bar 41 from a true transverse position relative to said rod 30. The nut 42 may be adjusted to further limit such shifting, or if desired, the nut 42 may be relatively remotely positioned and the walls of the cut-out 43 in the bar 41 permitted to restrict the shifting by engagement with the nut 44. Obviously, the nut 42 may be so adjusted that it and the walls of the cut-out 43 function together. A coupling construction provided with only the nut 42 or the cut-out 43 may be employed. Also any other suitable form of coupling may be substituted for those described herein in detail. A rigid coupling which does not permit shifting of the bar 25 or its substitute may be used entirely successfully. However, at times such a coupling results in one pair of brakes being applied somewhat ahead of the other pair. Suitable guides for directing the longitudinal course of the rods 23, 24, and 30 may optionally be provided.

In practicing our novel process for braking a vehicle hydraulically, we create hydraulic pressure which we direct toward braking wheels spaced apart transversely of the vehicle, and at at least substantially the same time, we create other hydraulic pressure which we apply toward braking other wheels spaced apart transversely on the vehicle.

Our invention finds application in fields in addition to that of motor vehicles of the type which are normally seen on the highways. For example, it may be used on railroad trains, Army trains and the like.

We have used the term "hydraulic" in the present specification and claims to embrace fluid controlled braking devices generally, including those operated by means of compressed air. Our process may be varied.

"Vehicle" is used in the claims to designate any conveyance travelling on wheels.

While we have described a specific embodiment of our invention for illustrative purposes, together with certain modifications thereof, it will be possible for persons skilled in the art to make variations and eliminations in the precise constructions described and this without departing from the true spirit and scope of our invention. We therefore wish to be limited herein only by the appended claims.

We claim:

1. In a device of the class described, two spaced apart piston rods, a bar member having openings extending therethrough adapted to receive said piston rods and having diameters greater than the piston rods which they respectively receive, means for limiting the movement of said bar in each direction on each rod, a control rod loosely received in a third opening through said bar, and means for controlling the movement of said bar in each direction on said control rod, at least some of said means being capable of having their positions on their respective rods adjusted.

2. In a device of the class described, a bar member having a cut-out on one side and having a hole extending through it and opening on said cut-out, two piston rods each pivotally mounted at one of its ends on said bar member, a control rod loosely received in said hole in the bar member and extending through said cut-out, and means for limiting the movement of said bar in each direction on said control rod, at least one of said limiting means being adjustable in position.

3. In a device of the class described, a bar member having an orifice extending through its general central portion, two piston rods each at least limitedly pivotally mounted adjacent one of its ends on said bar member, the construction being such that longitudinal movement of said piston rod ends relative to said bar is restricted, a control rod partially received in said orifice of said bar member, the diameter of said control rod being substantially smaller than that of said orifice whereby appreciable shifting of said bar member from a generally normal position relative to said control rod is permitted, and means for limiting the movement of said bar member in each direction on said control rod and for controlling the extent to which said bar member may shift from said generally normal position, a minimum of one of said limiting means being adjustable in position.

4. In a wheeled vehicle equipped with hydraulic brakes, two master cylinders, means for connecting one of said master cylinders to the brakes of the front wheels of said vehicle, means for connecting the other of said master cylinders to the brakes of the rear wheels of said vehicle, a piston in each said cylinder, a rod operatively connected to each said piston and extending from the respective cylinders, a cross bar having an orifice extending through its general central portion, means for pivotally connecting the free ends of said piston rods to opposite end portions of said cross bar, the construction being such that the longitudinal movement of said free ends relative said bar is restricted, a control rod partially received in said orifice of said cross bar, the diameter of said control rod being substantially smaller than that of said orifice whereby appreciable shifting of said cross bar from a generally normal position relative to said control rod is permitted, and means for limiting the movement of said cross bar in each direction on said control rod and for controlling the extent to which said cross bar may shift from said generally normal position, a minimum of one of said limiting means being adjustable in position.

5. Construction substantially as described in claim 4 but which includes a rockable cross head connected adjacent one of its ends to the otherwise free end of the control rod, and yieldable means operatively connected to said cross head adjacent its other end for normally urging said cross head in one position of its rocking movement.

6. In a device of the class described a cross bar having an orifice adjacent each of its ends, piston rods partially received in said orifices, said piston rods being of substantially smaller diameters than the orifices in which they are respectively received whereby appreciable shifting of said cross bar from a generally normal position relative to said piston rods is permitted, means on said piston rods for limiting the extent to which said cross bar may move in each direction on said piston rods and for controlling the extent to which said cross bar may shift from said generally normal position, a minimum of one of said limiting means being adjustable in position, and a control rod pivotally connected to the general central portion of said cross bar.

7. Construction substantially as described in claim 6 but which includes pistons operatively connected to the otherwise free ends of the piston rods, master cylinders receiving said pistons, means for connecting one of said master cylinders to the brakes of the front wheels of a wheeled vehicle and means for connecting the other of said master cylinders to the brakes of the rear wheels of said vehicle.

8. In a wheeled vehicle equipped with hydraulic brakes, two master cylinders, means for connecting one of said master cylinders to the brakes of the front wheels of said vehicle, means for connecting the other of said master cylinders to the brakes of the rear wheels of said vehicle, a piston in each said cylinder, a rod operatively connected to each said piston and extending from the respective cylinders, a bar member having openings extending through it adapted to receive the otherwise free ends of said piston rods and having diameters greater than the piston rods which they respectively receive, means for limiting the movement of said bar in each direction on each rod, a control rod loosely received in a third opening through said bar and means for controlling the movement of said bar in each direction on said control rod, at least some of said means being capable of having their positions adjusted on their respective rods.

EVERETT L. HOLLOWELL.
MUNSON T. BURK.